US008770909B2

(12) United States Patent
Parker

(10) Patent No.: US 8,770,909 B2
(45) Date of Patent: Jul. 8, 2014

(54) LAYER FORMATION TABLE AND PROCESS

(75) Inventor: Jonathan D. Parker, Sylvania, OH (US)

(73) Assignee: Kaufmann Engineered Group, Waterville, OH (US)

( * ) Notice: Subject to any disclaimer, the term of this patent is extended or adjusted under 35 U.S.C. 154(b) by 944 days.

(21) Appl. No.: 12/011,890

(22) Filed: Jan. 30, 2008

(65) Prior Publication Data
US 2009/0000415 A1 Jan. 1, 2009

Related U.S. Application Data

(60) Provisional application No. 60/997,087, filed on Oct. 1, 2007, provisional application No. 60/898,499, filed on Jan. 31, 2007.

(51) Int. Cl.
B66C 1/00 (2006.01)
(52) U.S. Cl.
USPC ............................................ 414/729; 901/41
(58) Field of Classification Search
USPC .................. 414/2, 788.1, 222.01, 799, 744.2, 414/744.3, 222.12, 791.6, 791.8, 791.9, 414/792.1, 796.8, 788, 789.2, 790.3, 790.2, 414/729; 901/7, 41; 53/443, 444, 445, 446, 53/447, 448, 147, 148, 150, 531, 537, 540, 53/541, 542, 543, 149, 544; 198/418, 198/418.5, 418.6, 418.7, 419.1, 426, 429, 198/430, 431, 433, 468.01, 468.9; 209/523, 209/653; 74/490.01
See application file for complete search history.

(56) References Cited

U.S. PATENT DOCUMENTS

| 3,543,949 | A | * | 12/1970 | Weier Roman J | 414/796.8 |
| 3,555,770 | A | * | 1/1971 | Rowekamp | 53/495 |
| 3,731,785 | A | * | 5/1973 | Stuart | 198/434 |
| 3,924,756 | A | * | 12/1975 | Milholen et al. | 414/791.9 |
| 3,979,878 | A | | 9/1976 | Berney | |
| 4,013,183 | A | * | 3/1977 | Milholen et al. | 414/802 |
| 4,290,517 | A | * | 9/1981 | Hafferkamp | 198/427 |
| 4,466,532 | A | * | 8/1984 | Minneman et al. | 198/468.01 |
| 4,607,476 | A | * | 8/1986 | Fulton, Jr. | 53/399 |
| 5,005,335 | A | * | 4/1991 | Yourgalite et al. | 53/399 |
| 5,553,442 | A | * | 9/1996 | Fadaie | 53/445 |
| 5,775,056 | A | | 7/1998 | Rauhala et al. | |
| 6,035,995 | A | * | 3/2000 | Leidy et al. | 198/430 |
| 6,047,523 | A | | 4/2000 | Eyre et al. | |
| 6,082,080 | A | * | 7/2000 | Holter et al. | 53/540 |
| 6,216,422 | B1 | | 4/2001 | Christ et al. | |
| 6,328,153 | B1 | * | 12/2001 | Manghi et al. | 198/736 |
| 6,658,816 | B1 | | 12/2003 | Parker et al. | |

(Continued)

OTHER PUBLICATIONS

International Search Report; Date of Issuance: Aug. 4, 2009.

Primary Examiner — Gregory Adams
Assistant Examiner — Glenn Myers
(74) Attorney, Agent, or Firm — Emch, Schaffer, Schaub & Porcello Co., L.P.A.

(57) ABSTRACT

This device is for the formation and transfer of rows of articles. In particular, the device is for the formation of a row of articles on a layer formation table and the transfer of the row from one processing operation to another. A programmable robot and EOAT easily sweeps or pushes the load (tier) down the layer formation table returns to it's original position. A single, programmable robot performs all functions. The absolute unique end of arm tooling (EOAT) is fitted to the robot. The articles of one row are nested in the voids between articles in an adjacent row.

18 Claims, 6 Drawing Sheets

(56) References Cited

U.S. PATENT DOCUMENTS

| | | | |
|---|---|---|---|
| 6,695,569 B2 * | 2/2004 | Hofer | 414/792.9 |
| 6,793,064 B2 * | 9/2004 | Schoeneck et al. | 198/419.3 |
| 7,000,365 B2 | 2/2006 | Nutley et al. | |
| 7,021,029 B2 | 4/2006 | Hannen et al. | |
| 7,325,668 B2 * | 2/2008 | Borsarelli et al. | 198/430 |
| 7,409,812 B2 * | 8/2008 | Gilmore et al. | 53/475 |
| 7,784,599 B2 * | 8/2010 | Balleza et al. | 198/432 |
| 2005/0056521 A1 * | 3/2005 | Keyes | 198/418.5 |
| 2005/0063815 A1 * | 3/2005 | Pierson et al. | 414/799 |
| 2006/0016094 A1 * | 1/2006 | Covert | 34/217 |

* cited by examiner

LAYER FORMATION TABLE AND PROCESS

CROSS REFERENCE TO PRIOR APPLICATION

This application claims the benefit of provisional patent application Ser. No. 60/997,087 filed Oct. 1, 2007 and of provisional patent application Ser. No. 60/898,499 filed Jan. 31, 2007.

TECHNICAL FIELD

This invention relates to a case/bulk layer formation table and process including a multiaxis programmable, robot. In one embodiment, the invention relates to innovative end-of-arm tool on the cantilevered arm of the robot designed to transfer rows of bulk product (bottles). The invention is programmed to build a load on the layer formation table.

BACKGROUND OF THE INVENTION

Conveyors are commonly used in manufacturing and processing operations to move articles or goods from one operation to another. For many types of operation it is advantageous to have the articles grouped for batch processing. Such typical batch-processing operations include applying labels to bottles or cans or other types of containers, packing bottles, cans or boxes into crates, or filling containers with liquid or semi-liquid material. A number of devices or systems are known that group articles for batch processing. Many of the systems known in the prior art use a system that run alongside one side or both sides of the conveyor transporting the articles to be processed.

The prior art devices have several disadvantages. They are cumbersome and require space to each side of the conveyor and above the conveyor. They also are material-intensive and thus, expensive. Further they also are power-intensive because they run continuously. Furthermore, these devices do not change configuration of the number of articles abreast, i.e., they do not convert a single or double file feed of articles to multiple articles abreast, but merely create a distance between one group of rows of articles and a following group.

Typically prior art transfer is carried out with an overhead frame. The prior art unit uses a complicated system including assemblies extending transversely of the apparatus in and being vertically movable toward and away from one another in a vertical transverse plan. Upper and lower crankshafts are intermittently drive through a one-revolution cycle often by a chain and sprocket drive mechanism. After sweeping or pushing the load, the device must be raised, moved back to its starting point and lowered on the next load.

BRIEF DESCRIPTION OF THE INVENTION

The present invention relates to a device and process for the formation and transfer of groups of articles. In particular, the present invention relates to a device for the formation of a group of articles on a conveyor and the transfer of the group from one processing operation to another. More particularly, the present invention relates to a device for transferring groups of articles at right angles to the initial feed direction. The programmable robot and EOAT easily sweeps or pushes the load (tier) down the conveyor and returns to it's original position.

The preferred embodiment is an apparatus for transferring articles comprising: a layer formation table; and a means for supplying articles to the layer formation table wherein at least one row of the articles is formed on the table. The at least one row of the articles is formed at a first end of the layer formation table. The apparatus further comprises a programmable robot including an end of arm tool for transferring the row of the articles. The robot transfers the row of articles towards a second end of the layer formation table.

In this invention, the single, programmable robot for transferring performs all functions. The absolute unique end of arm tooling (EOAT) is fitted to the robot. This eliminates the complicated overhead transferring structure of the prior art.

The invention is programmed to build a load on the layer formation table.

The articles used to build a tier of products may vary widely. The articles may be any type of container. In a preferred embodiment, the articles may be bottles or cans. In another embodiment, the articles may be boxes or cartons. In another preferred embodiment the articles may be a single case of product. In another embodiment, the articles may be cases of product.

Other objects and advantages of the present invention will become apparent to those skilled in the art upon a review of the following detailed description of the preferred embodiments and the accompanying drawings.

DETAILED DESCRIPTION OF THE INVENTION

This invention is a case/bulk layer formation table including a multiaxis programmable, robot. In one embodiment, the invention relates to innovative end-of-arm tool on the cantilevered arm of the robot designed to transfer rows of bulk product (bottles) or cases.

The process for transferring articles comprising the steps of: providing a layer formation table; supply articles to the layer formation table; forming at least one row of the articles at a first end of the table; and providing a programmable robot including an end of arm tool for transferring the row of the articles towards a second end of the table. The process further comprises the step of configuring the robot to build a tier of products on the layer formation table.

Figure 1:
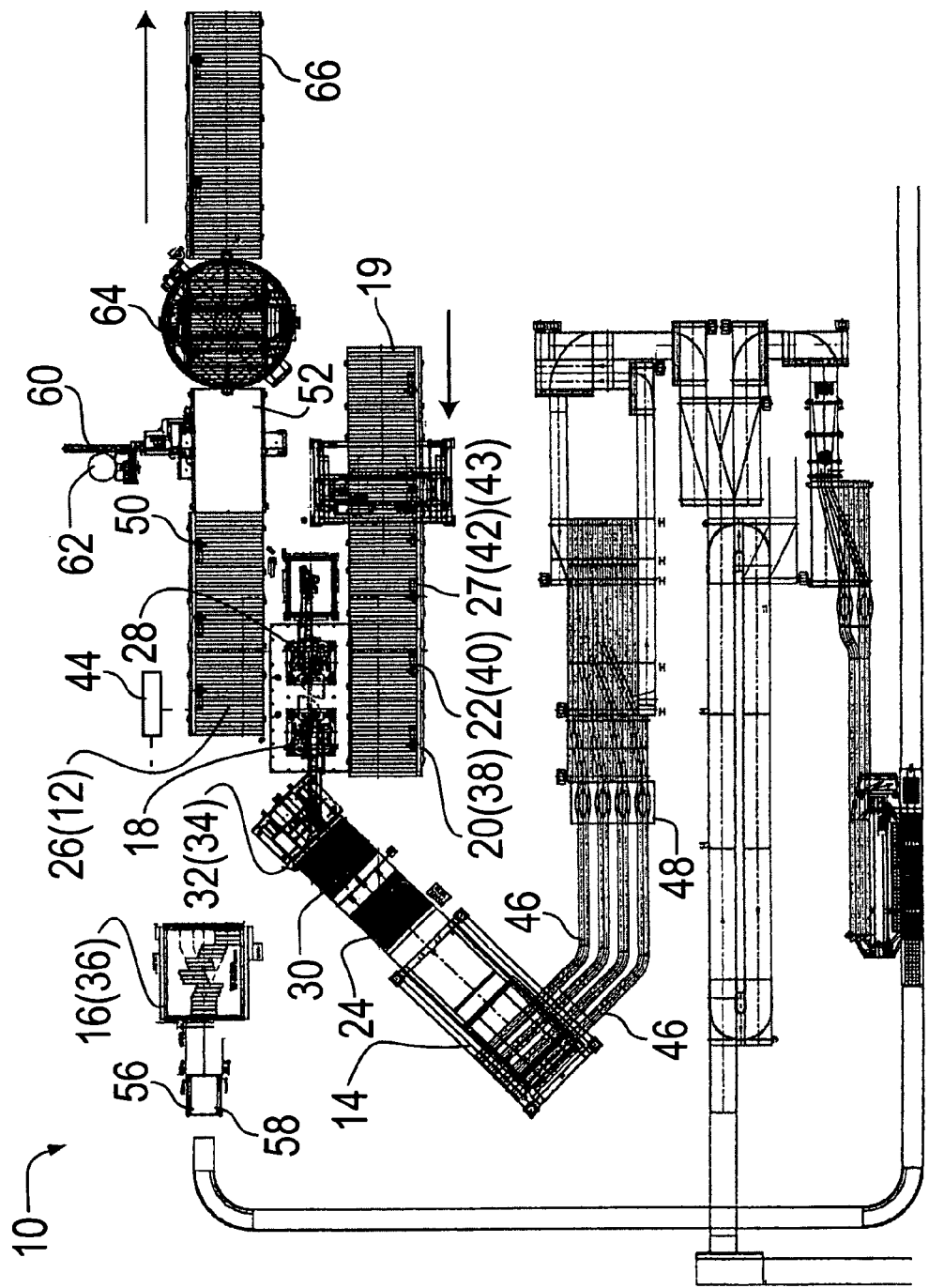
FIG. 1 is a top schematic view showing a packaging system in which the apparatus of this invention may be used.

FIG. 1 shows system 10 for packaging load 12 comprising bulk product feeder 14, tier case station 16 and programmable, articulate robot 18. Dunnage supply line 19 feeds system 10. System 10 also includes pallet station 20, tier sheet station 22, tier staging area 24, load build area 26, top frame station 27, programmable, articulate, robot 28 and tier pick up area 30. Robot 18 is a single means for placing tiers 32 of the bulk product 34 or cases 36 in load build area 26. Robot 28 is a single means for placing pallets 38, tier sheets 40 and top frame 42 in load build area 26. Robot 18 picks up tier 32 at tier pickup area 30 and discharges it at load build area 26.

In one embodiment, robot 18 picks up case 36 from tier case station 16 and places them in load building area 26. The two robot system provides flexibility in that the line can still run if one side is down for repair, maintenance or product set up. In this embodiment, robot 28 picks up top cap 43 instead of top frame 42. Pallets, tiers, tier sheets, top frames and top caps often are referred to as dunnage.

Bulk product feeder 14 typically comprises a multiplicity of parallel conveyor belts 45 which carry rows of bulk product 34 (bottles). Frame 48 support belts 46. The rows are fed to the tier staging area 24. Tier staging area 24 typically includes a conveyor which comprises frames and supporting feed belts. Usually tier staging area 24 is at the end of bulk product feeder 14.

Tier case station 16 typically comprises a multiplicity of parallel conveyor belts 56 which carry cases 36 of product 34 (bottles). Frame 58 support belts 56. The cases are fed to load build area 26 for pick up by robot 18.

Cases as used herein may vary widely. Typically cases means a case of 24 beer bottles. Cases may include a 6 pack, 12 pack, 18 pack, 30 pack and the like. The case may be corrugated cases, chip board cases or film wrapped bundles of product. A typical film wrapped case is a film wrapped package of six or twelve rolls of paper towels.

Tier sheet station 22 comprises conveyor which includes a frame supporting rollers. Tier sheet station 22 is next to pallet station 20 and also parallel to load build area 26. Robot 28 picks up pallet 38 from pallet station 20 and locates it at load build area 26. This is followed sequentially by alternating layers of tier sheet 40 and tier 32 (cases 36). In one embodiment where no pallet 38 is employed, the first layer is tier sheet 40.

The rows of product 34 form tier 32 on a conveyor. The conveyor then transports tier 32 to tier staging area 24. As will be shown later, tier 32 is located in load build area 26 by robot 18. Dunnage supply line 19 provides pallets 38 to pallet station 20 and top frames 42 to top frame station 28. Line 19 feeds to stations 20 and 28. Pushers such as chain transfers 54 and 56 move pallets 38 and top frames 42 to stations 20 and 28, respectively.

Pallet station 20 comprises conveyors which includes frames supporting a multiplicity of rollers. Pallet station 20 usually is near load build area 26. Tier sheet station 22 comprises conveyors, frames and a multiplicity of rollers.

Dunnage line 19 comprises conveyors which includes frames supporting a multiplicity of rollers.

Top frame station 28 comprises conveyors which includes a frame supporting a multiplicity of rollers.

When the tier comprises cases 36, top frame station 28 feeds top caps 43 instead of top frames 42.

Load conveyor 50 removes load 12 from load building area 26. Conveyor 50 comprises frames and rollers. Typically, conveyor 50 transfers load 12 strapping area 52.

FIG. 1 also shows control 44, which may be a programmable logic controller (PLC), and power control panel to operate system 10 through conventional circuitry not shown. Control 44 controls robot 18 and robot 28 and co-ordinates their operation with dunnage line 19, feeder 14 and station 16.

PLC's in a control panel controls system 10, the load and dunnage conveying system. The PLC's in the control panel controls the tier building system. PLC's interface with the control, which controls robot 18 and robot 28. PLC's also interfaces with other PLC's and is the main control for system 10. Power control panels are wired to their respective drives and sensors and actuators.

FIG. 1 also shows strapper 60 which straps load 12. Control 62 controls strapper 60. While strapping preferably is used for bulk product 34, strapping may be with cases 36 as well. Orienting station 64 turns load 12 after a first strapping and sends load 12 back to station 60 for a second strapping perpendicular to the first. Load 12 then moves down conveyor 66 to storage or shipping.

Figure 2:
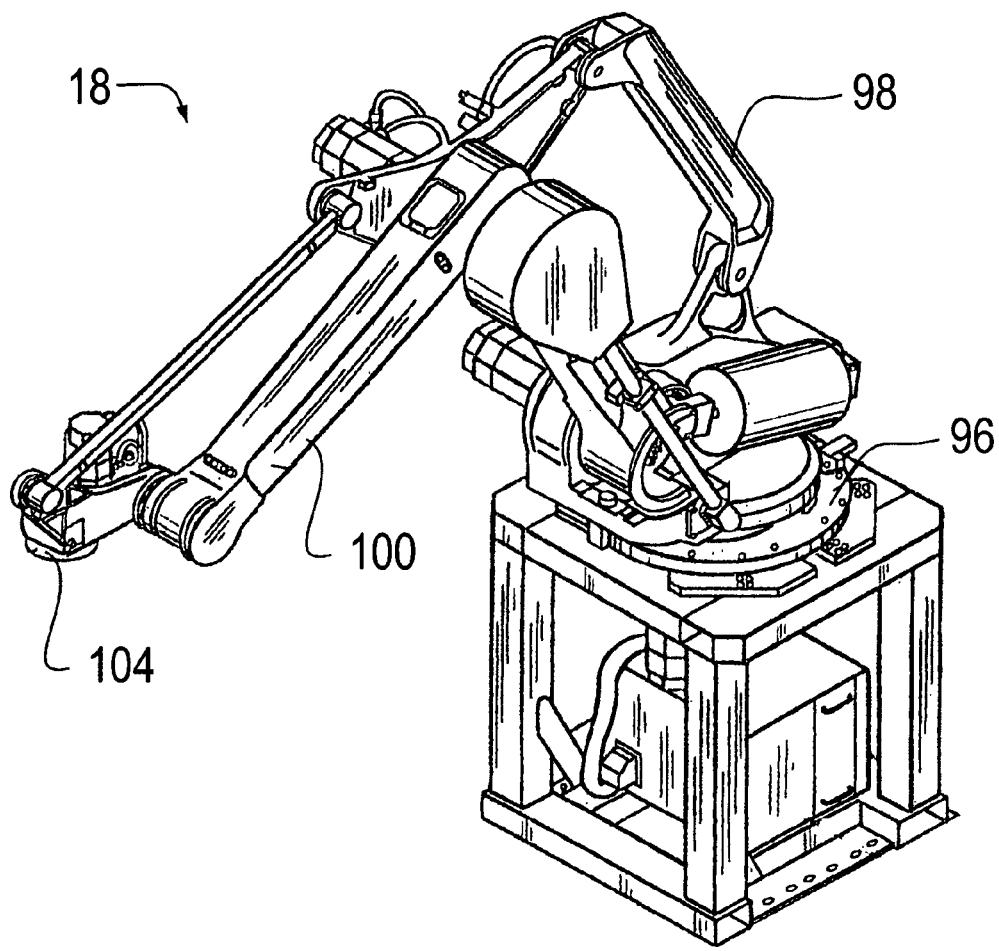
FIG. 2 is a perspective view of a programmable multi-axis robot used with this invention.

FIG. 2 shows robot 18 or 28 in greater detail. For this drawing, robot 18 will be used to illustrate either robot. Robot 18 mounts on main rotary axis 96 and can rotate 360° about axis 96. Robot 18 also includes main support post 98 extending vertically from axis 96. Cantilevered arm 100 extends from post 98 and carries end effector 102. Effector 102 is capable of locating tiers 32 or cases 36 into load building area 26 to build load 12.

A distal end of cantilevered arm 100 carries mounting plate 104. Plate 104 attaches to arm 100 with conventional fasteners and effector 102 attaches to plate 104 with similar mechanical fasteners.

Robot 18 is a programmable multi-axis robot. Previously discussed controllers controls robot 18. Typically the multi-axis robot 18 has five axes of motion. In another embodiment arm 100 may be a Cartesian arm.

Figure 3:
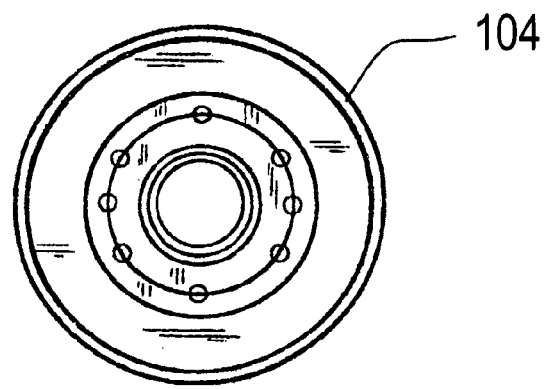
FIG. 3 shows the mounting plate of the robot of FIG. 2.

FIG. 3 shows mounting plate 104 in greater detail.

Figure 4:
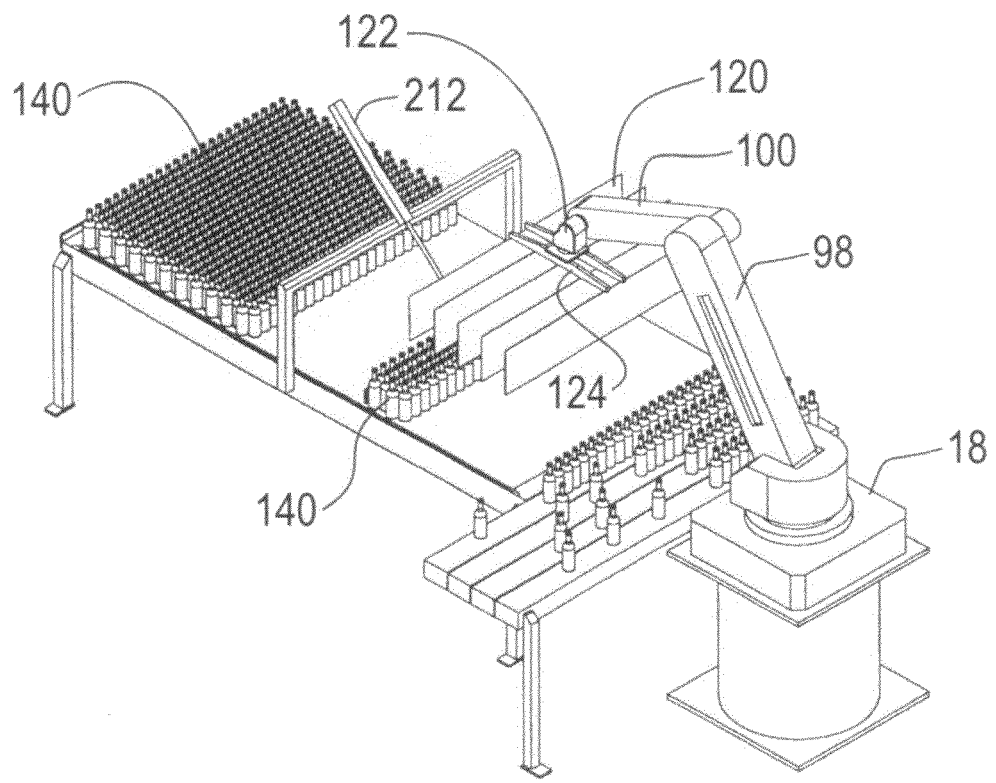
FIG. 4 is a schematic view showing an EOAT for sweeping rows of bulk product (bottles).

FIG. 4 is a schematic view showing EOAT 120 for sweeping rows of bulk product (bottles) 140. In system 10 of FIG. 1, robot 18 and EOAT 120 of this invention may be used in to load bulk product 140 or tier case station 16. EOAT 120 shown comprises a multiplicity of guides which form lanes. The rows of bottles fill the lanes. Cylinders 122 fire clamping tools 124 which lock the rows of bottles in the lanes between the guides. Robot 18 then sweeps the load down the conveyor to the next station. Clamping tools 122 are released and robot 18 lifts EOAT 120 and returns it to its starting position.

Figure 5:
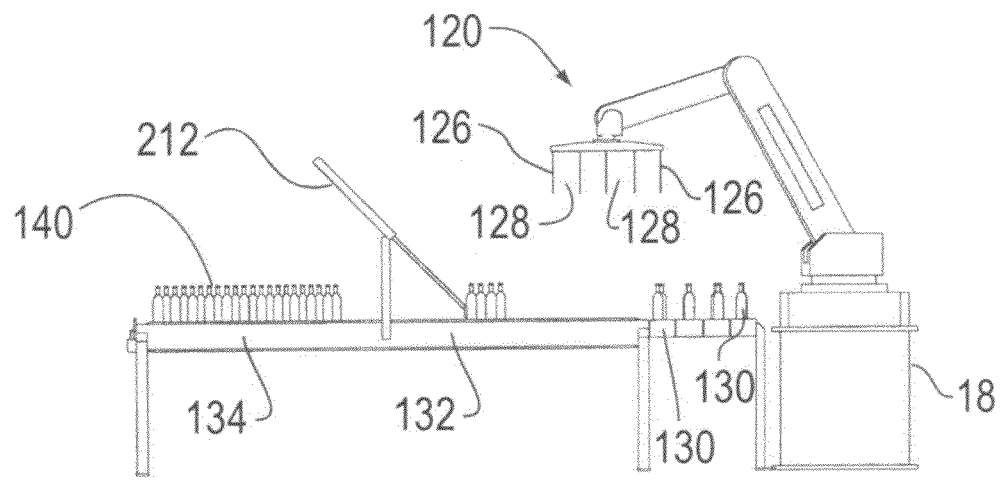
FIG. 5 is a side schematic view showing another view of the EOAT of FIG. 4 showing a pusher for sweeping cases of bulk product.

FIG. 5 is a side schematic view showing another view of EOAT 120 of FIG. 4 in greater detail. EOAT 120 comprises a multiplicity of guides 126 which forms lanes 128. Rows 130 of bottles 140 fill lanes 128. Robot 18 sweeps rows 130 down conveyor 132 to station 134. Tiers of product are built in staging area 202 by accumulating rows articles against tier accumulation stop 212. Tier accumulation stop 212 is configured to raise in order to allow the tiers of product to move down conveyor 132 to station 134.

In another embodiment EOAT 120 acts as a pusher and pushes cases of bulk product in rows 130 down conveyor 132 to station 134. In this embodiment, the EOAT is a pusher that pushes the cases down the conveyor instead of sweeping.

Figure 6:
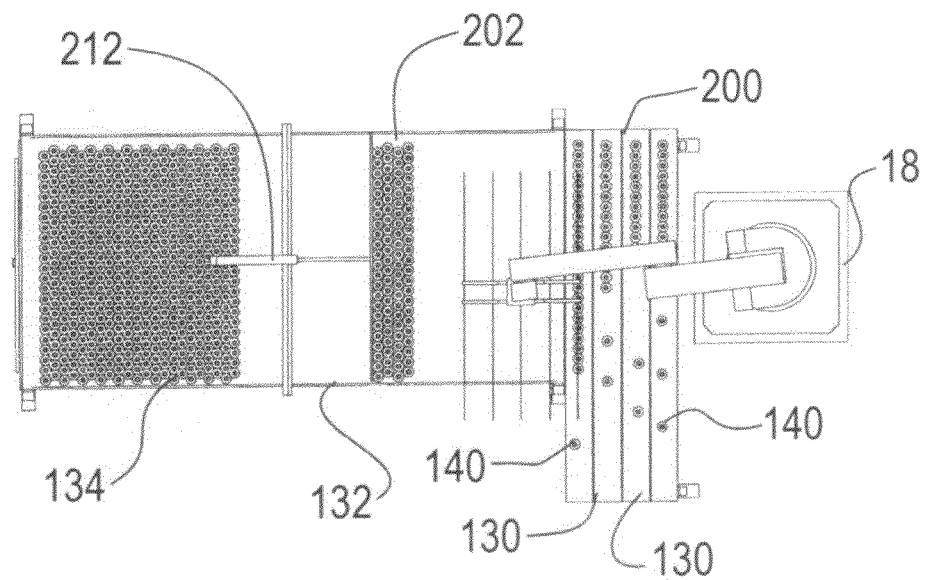
FIG. 6 is a top schematic view showing a grouping and transfer station receiving a continuous single file feed of bulk product (bottles).

FIG. 6 is a top schematic view showing a grouping and transfer station 200 receiving a continuous single file feed of bulk product (bottles) 140. In FIG. 6, the grouping and transfer station 200 receives continuous single file feed 130 of bottles 140, groups bottles 140 to rows of multiple bottles 140 abreast as illustrated. EOAT 120 transfers row 130 at right angles to the direction of the initial bottle feed to staging area 202. Robot 18 EOAT 120 of FIG. 4 sweep rows 130 onto downstream conveyor 132. Staging area 202, as well as a grouping area 200 are shown. Rows 130 are swept downstream to processing station 134.

Figure 7:
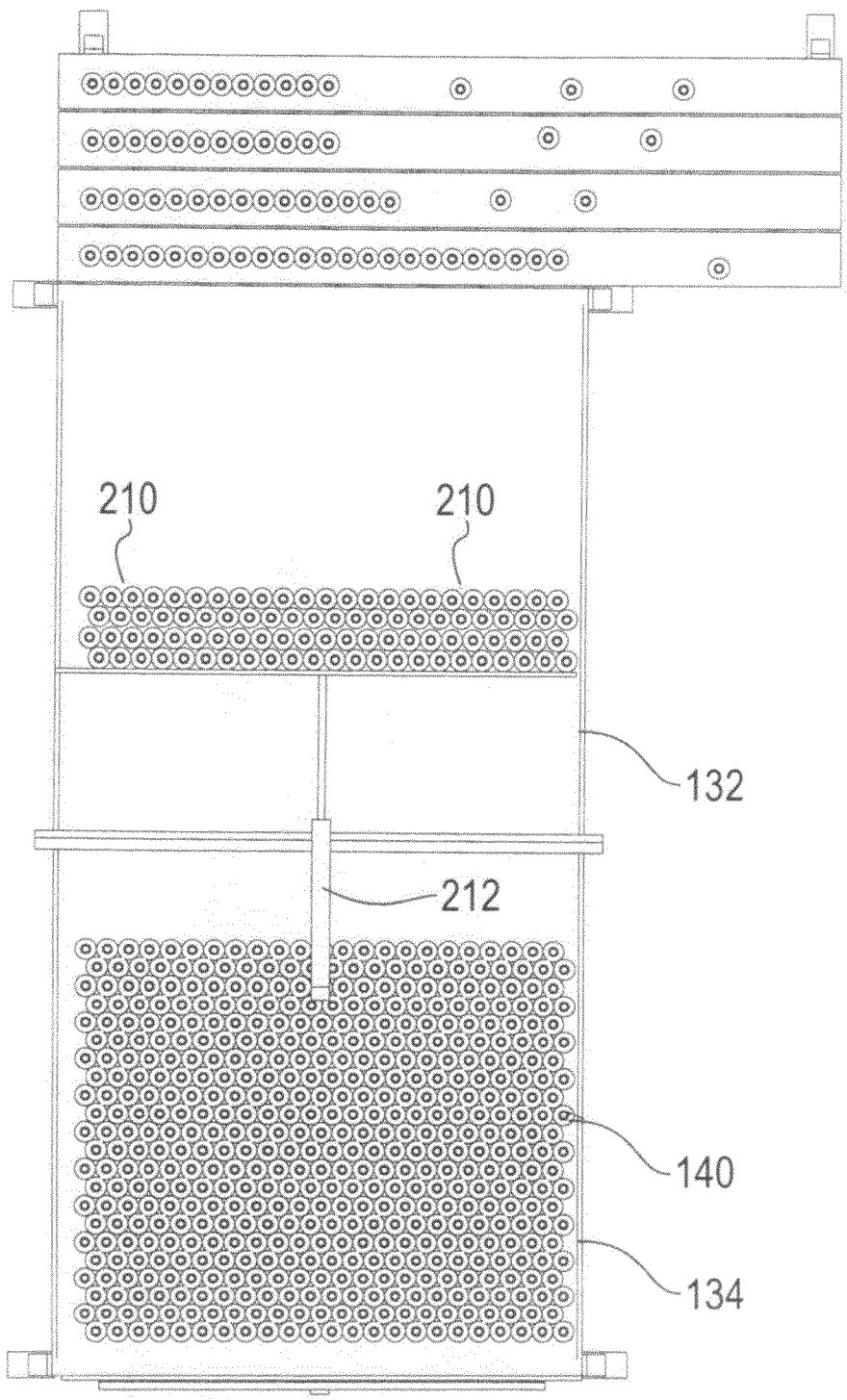
FIG. 7 is a top schematic view showing a grouping and transfer station so that adjacent rows are staggered so that the bottles are nested.

FIG. 7 is a top schematic view showing the grouping and transfer station of FIGS. 4-6 so that adjacent rows are staggered so that the bottles are nested in voids 210. This apparatus for packing articles, particularly bottles, in units each consisting of a plurality of parallel rows or articles, each row comprising a plurality of articles, in side by side contact, and with the rows in contact, comprising means for collating articles into units. Each unit of articles, as formed, is deposited on a conveyor and conveyed by the robot and EOAT of FIGS. 4-6. In collating cylindrical bottles (or other cylindrical articles), the rows are staggered for nesting of bottles 140 to reduce voids 210 in the units.

Figure 8:
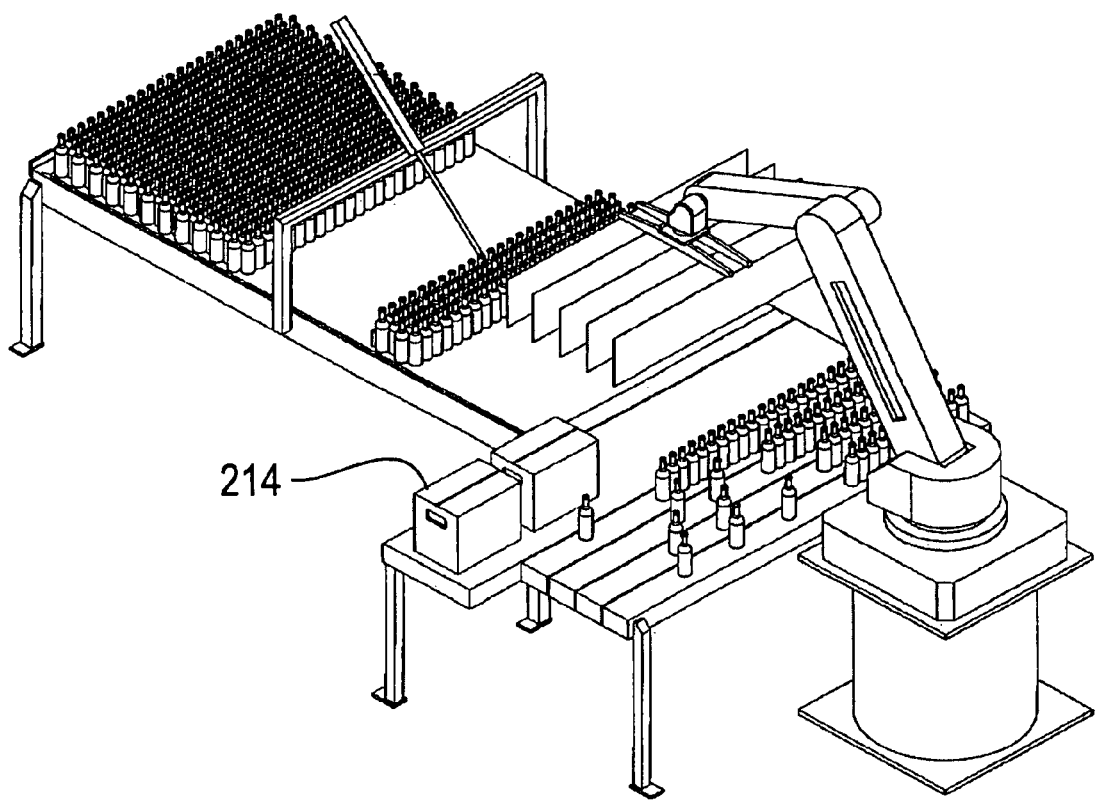
FIG. 8 is a schematic view showing cases of product being fed to the layer formation table.

FIG. 8 is a schematic view showing cases of product being fed to the layer formation table. Cases 214 are fed to station 200.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. An apparatus for transferring articles comprising:
a layer formation table;
means for supplying articles to the layer formation table wherein at least one row of the articles is formed at a first end of the layer formation table; and
a programmable robot including an end of arm tool for transferring the at least one row of the articles towards a second end of the layer formation table;
a plurality of rows of the row of articles formed on the layer formation table wherein each of the rows comprises a plurality of articles in side by side contact creating a void between adjacent articles in each of the rows;
Wherein the programmable robot is configured to nest the articles of one of the rows in the voids of an adjacent row;
wherein the programmable robot is configured to build a tier of products on the layer formation table;
wherein the end of arm tool is a multiplicity of guides which form lanes wherein the at least one row of articles fill the lanes;
wherein the end of arm tool further comprises clamping tools which lock the rows at least one row of articles between the guides;
wherein the end of arm tool further comprises cylinders that actuate the clamping tools; and
wherein the programmable robot and the guides of the end of arm tool sweep the at least one row of articles from the first end of the layer formation table towards the second end of the layer formation table.

2. An apparatus according to claim 1 wherein the programmable robot and the end of arm tool push the rows of articles from the first end of the layer formation table towards the second end of the layer formation table.

3. An apparatus according to claim 1 wherein the articles are bulk product.

4. An apparatus according to claim 1 wherein the articles are containers.

5. An apparatus according to claim 1 wherein the article are bottles or cans.

6. An apparatus according to claim 1 wherein the articles are a single case of product.

7. An apparatus according to claim 1 wherein the articles are cases of product.

8. An apparatus according to claim 1 wherein the means for supplying articles generally is at right angles to the flow of the layer formation table.

9. An apparatus according to claim 1 wherein the means for supplying articles may be at any angle relative to the flow of the layer formation table.

10. An apparatus according to claim 1 wherein the means for supplying articles is movable along a forward and rearward path perpendicular to the at least one rows of the articles.

11. An apparatus according to claim 1 wherein the programmable robot is programmed to raise the end of arm tool after transfer to the second end of the layer formation table.

12. An apparatus according to claim 11 wherein the programmable robot is programmed to return the end of arm tool after transfer to the first end of the layer formation table.

13. An apparatus according to claim 1 wherein the guides of the end of arm tool turn the at least one row of the articles on the layer formation table.

14. An apparatus according to claim 1 wherein the means for supplying articles to the layer formation table is a conveyor.

15. An apparatus according to claim 1 wherein the layer formation table is a conveyor.

16. An apparatus according to claim 1 wherein the programmable robot is configured to change the end of arm tool relative to the articles being transferred.

17. An apparatus according to claim 1 wherein the programmable robot is configured to change the end of arm tool relative to the tier of products being built on the layer formation table.

18. An apparatus according to claim 1 further comprising a tier accumulation stop.

* * * * *

UNITED STATES PATENT AND TRADEMARK OFFICE
CERTIFICATE OF CORRECTION

PATENT NO. : 8,770,909 B2  
APPLICATION NO. : 12/011890  
DATED : July 8, 2014  
INVENTOR(S) : Jonathan D. Parker It is certified that error appears in the above-identified patent and that said Letters Patent is hereby corrected as shown below:

On the title page, Item (73) originally listed the assignee as "Kaufmann Engineered Group." This was incorrect and the title page has been corrected to list the Assignee as "Kaufman Engineered Systems."

Signed and Sealed this
Sixth Day of January, 2015

Michelle K. Lee
*Deputy Director of the United States Patent and Trademark Office*